(12) United States Patent
Lee et al.

(10) Patent No.: US 7,599,142 B2
(45) Date of Patent: Oct. 6, 2009

(54) APPARATUS AND METHOD FOR SLIDER-DISK CONTACT INDICATION BY MONITORING THE SPINDLE CONTROL SIGNAL IN A HARD DISK DRIVE

(75) Inventors: SungChang Lee, San Jose, CA (US); Brian D. Strom, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 12/006,826

(22) Filed: Jan. 3, 2008

(65) Prior Publication Data

US 2009/0174962 A1 Jul. 9, 2009

(51) Int. Cl.
*G11B 15/46* (2006.01)
*G11B 21/02* (2006.01)
*G11B 27/36* (2006.01)

(52) U.S. Cl. .................. 360/73.03; 360/75; 360/31
(58) Field of Classification Search .................. None
See application file for complete search history.

(56) References Cited

U.S. PATENT DOCUMENTS 6,105,432 A * 8/2000 Taniguchi et al. ............. 73/649

6,476,996 B1 * 11/2002 Ryan .......................... 360/75

* cited by examiner

*Primary Examiner*—Andrew L Sniezek
(74) *Attorney, Agent, or Firm*—GSS Law Group; Earle Jennings

(57) ABSTRACT

A hard disk drive including an electrical property meter sensing a spindle control signal to create an electrical property reading. Spindle control signal stimulates spindle motor to rotate at least one disk, creating rotating disk surface accessed by slider. Control circuit receives electrical property reading to create contact indication of slider contacting rotating disk surface, which may further include determining contact indication as spike in electrical property history of the readings. The electrical property meter may include ammeter and/or voltmeter. The control circuit, printed circuit board assembly, and/or motor control interface may include the electrical property meter. The control circuit may also include processor receiving electrical property reading to create contact indication. The hard disk drive may update contact log when contact indicated and may further update access parameter list for the slider accessing the rotating disk surface based upon the contact log.

19 Claims, 4 Drawing Sheets

APPARATUS AND METHOD FOR SLIDER-DISK CONTACT INDICATION BY MONITORING THE SPINDLE CONTROL SIGNAL IN A HARD DISK DRIVE

TECHNICAL FIELD

This invention relates to detecting contact between a slider and a rotating disk in a hard disk drive by detecting changes in a spindle motor control signal.

BACKGROUND OF THE INVENTION

Contact between a slider and the rotating disk surface it accesses is a key factor leading to reliability failures in hard disk drives. These contacts can occur during normal operations of the hard disk drive for any of several reasons, such as changes in environmental or atmospheric condition and/or external mechanical shocks which may include dropping a notebook computer or music player containing the hard disk drive.

Hard disk drive manufacturers have difficulty knowing when such contacts occur. Previously, two approaches existed for detecting contacts: the first relied on frequent measurement of the flying height clearance of the slider off the rotating disk surface. The second relied on monitoring the positional error of the slider when following a track on the disk surface, if it jumped suddenly, then contact could be surmised.

Both of these approaches have problems. The first approach was not economically feasible in mass produced hard disk drives because it was risky and tended to degrade performance. The second approach could only detect a strong, disruptive contact at certain head positions. It could not detect any contact. And its detection tended to lag behind the event, making it difficult to know exactly when contact occurred. Neither approach is acceptable.

An economical, non-disruptive approach is needed to monitoring the activity of a hard disk drive that accurately detects these contacts between a slider and the rotating disk surface it accesses, which can be field deployed in hard disk drives.

SUMMARY OF THE INVENTION

One embodiment of the invention is a hard disk drive including an electrical property meter coupled to a control path and sensing a spindle control signal to create an electrical property reading. The spindle control signal is delivered by the control path and used to stimulate a spindle motor to rotate at least one disk, creating a rotating disk surface accessed by a slider. A control circuit receives the electrical property reading and indicates changes in the electrical property reading to identify probable contact of the slider with the rotating disk surface. It is anticipated that a hard disk drive including this embodiment will cost approximately the same as prior art hard disk drives, but may accurately detect contacts between the sliders and the rotating disk surfaces in the hard drive without disrupting normal access operations.

The process of receiving the electrical property reading to create the contact indication may further include steps monitoring the electrical property reading to create an electrical property history and determining the contact indication as a spike in the electrical property history. The electrical property meter may include an ammeter and/or a voltmeter.

The control circuit, a printed circuit board assembly, and/or a motor control interface may include the electrical property meter in various embodiments. The control circuit may also include a processor receiving the electrical property reading to create the contact indication.

The hard disk drive may update a contact log when the contact indication is determined and may further update an access parameter list for the slider accessing the rotating disk surface based upon the contact log.

DETAILED DESCRIPTION

This invention relates to detecting contact between a slider and a rotating disk in a hard disk drive, in particular, to the indication of these contacts through changes in the readings of at least one electrical property for a spindle control signal, where the spindle control signal stimulates the spindle motor to rotate disks.

One embodiment of the invention is a hard disk drive including an electrical property meter coupled to a control path for sensing a spindle control signal to create an electrical property reading. The spindle control signal is delivered by the control path and used to stimulate a spindle motor to rotate at least one disk, creating a rotating disk surface accessed by a slider. A control circuit receives the electrical property reading and indicates changes in the electrical property reading to identify probable contact of the slider with the rotating disk surface. It is anticipated that a hard disk drive including this embodiment will cost approximately the same as prior art hard disk drives, but may accurately detect contacts between the sliders and the rotating disk surfaces in the hard drive without disrupting normal access operations.

Figure 1:
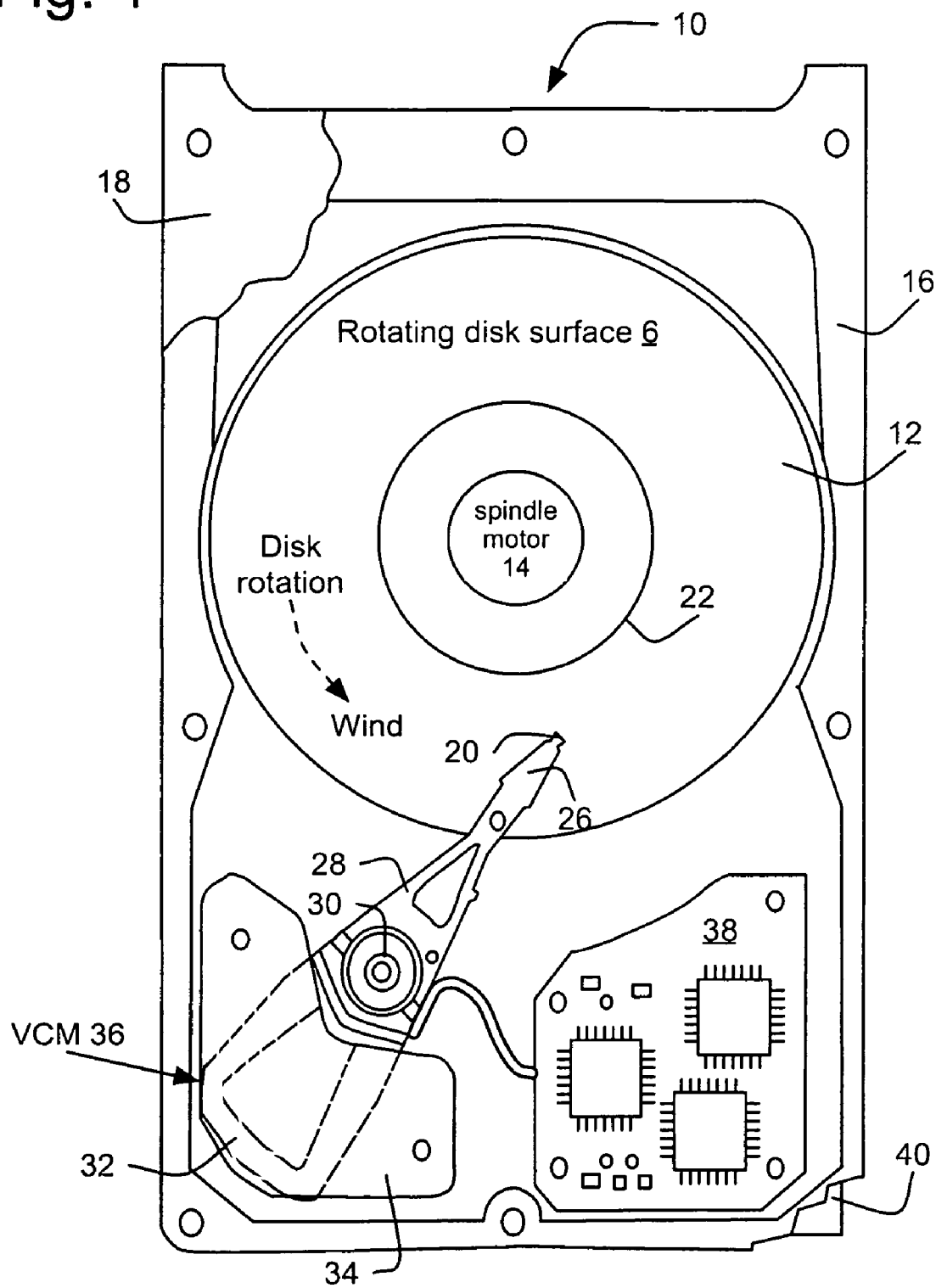
FIG. 1 shows a cutaway view of an embodiment of the hard disk drive, including a disk rotated by a spindle motor to create a rotating disk surface. A voice coil motor positions a slider near a track on the rotating disk surface. A control circuit indicates contact between the slider and the rotating disk surface while controlling the spindle motor and the voice coil motor.

Referring to the drawings more particularly by reference numbers, FIG. 1 shows a cutaway view of an embodiment of the hard disk drive 10, including a disk 12 rotated by a spindle motor 14 to create a rotating disk surface 6. A voice coil motor 36 positions a slider 20 near a track 22 on the rotating disk surface. A control circuit 40 indicates contact between the slider and the rotating disk surface while controlling the spindle motor and the voice coil motor. The voice coil motor may preferably include a voice coil 32 coupled to a head stack with at least one actuator arm 28 coupling through a head gimbal assembly 26 to a slider 20. The slider is preferably included in the head gimbal assembly. A vertical micro-actuator may be used to alter the flying height of the slider off the rotating disk surface and may be part of the slider or included in a micro-actuator assembly coupled to the slider that is included in the head gimbal assembly. The control circuit communicates with both the slider and the vertical micro-actuator, through the voice coil motor and through the head gimbal assembly. A printed circuit assembly 38 may be used for power circuitry as directed by the control circuit.

The spindle motor 14 attempts to rotate the disk 12 at a constant rotational rate, often at least 5400 Revolutions Per Minute (rpm) or higher. Contact between the slider 20 and the rotating disk surface 6 increases the work required to maintain that rotational rate, which increases an electrical property such as the voltage or current required to drive the spindle motor. Various embodiments of this invention use this effect to detect the contact between the slider and the rotating disk surface.

Figure 2:
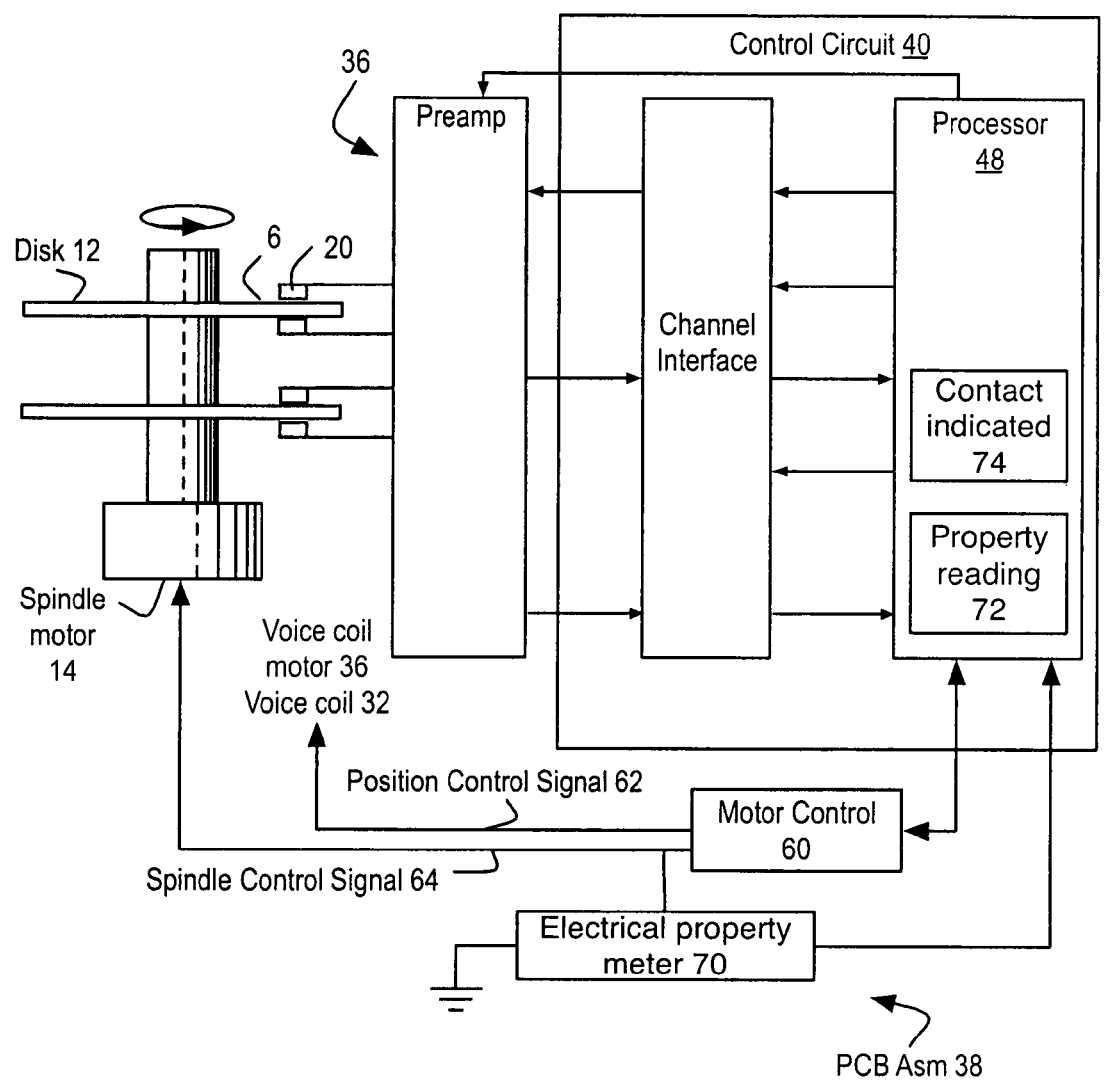
FIG. 2 shows in a schematic fashion some details of the circuitry of the hard disk drive of FIG. 1. The control circuit controls a spindle control signal delivered by the control path to stimulate the spindle motor to rotate at least one disk creating a rotating disk surface. The voice coil motor positions at least one slider near the rotating disk surface. An electrical property meter senses the spindle control signal to create an electrical property reading. The control circuit receives the electrical property reading to create a contact indication of the slider contacting the rotating disk surface.

FIG. 2 shows in a schematic fashion some details of the circuitry of the hard disk drive 10 of FIG. 1. The control circuit 40 controls a spindle control signal 64 delivered by a control path 66 to stimulate the spindle motor 14 to rotate the disk 12 creating a rotating disk surface 6, shown in FIG. 1. The control path may be implemented as a single driven line using a shared ground line or as a pair of lines. The voice coil motor 36 positions at least one slider 20 near the rotating disk surface. An electrical property meter 70 is electrically coupled to the control path and senses changes in the spindle control signal to create an electrical property reading 72. The control circuit receives the electrical property reading to create a contact indication 74 of the slider contacting the rotating disk surface.

To initiate normal access operations, the spindle motor 14 is stimulated by the spindle control signal 64 to rotate the disks 12, which causes a wind from the rotating disk surface 6 to interact with an air bearing surface on the slider 20, making it fly a small distance off the disk surface. This is when contact with the slider and the rotating disk surface can cause access failures. The slider is flying a short distance, often less than ten nanometers, above the disk surface. Mechanical shocks, vibrations, minor bumps in the disk surface, dust particles and changes in atmospheric conditions can cause the slider to contact the disk surface. These contact events are over the data tracks 22, which can be damaged by contact, possibly causing a loss of data.

The control circuit 40, a printed circuit board assembly 38, and/or a motor control interface 60 may include the electrical property meter 70 in various embodiments. The control circuit may also include the processor 48 receiving the electrical property reading 72 to create the contact indication 74. In certain embodiments, the hard disk drive 10 may not include a separate printed circuit board assembly.

This invention provides economical indication of these contacts and gives hard disk drive manufacturers the opportunity to adjust their manufacturing process based upon real world knowledge of these contact events. Also the hard disk drive itself can compensate for these events.

Figure 3:
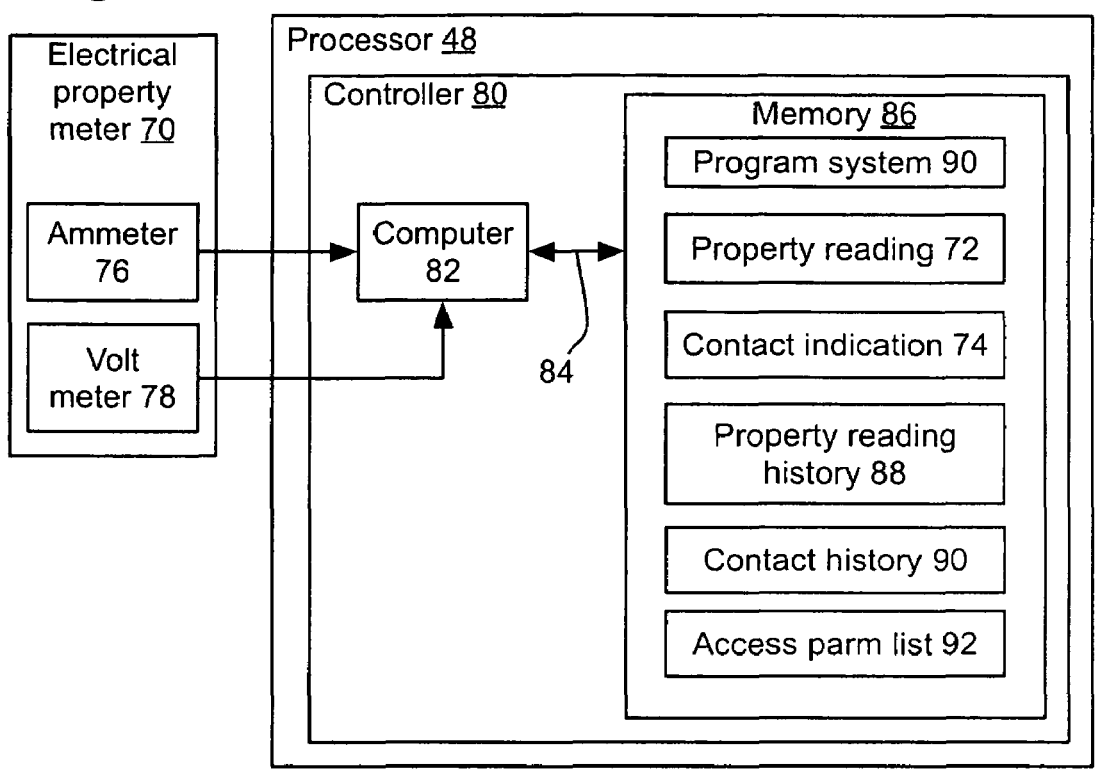
FIG. 3 shows a detail of the schematic of the control circuit of FIG. 2, with a processor including at least one instance of a controller, the controller including a computer accessibly coupled via a buss to a memory. The computer is instructed by a program system to at least partly implement receiving the electrical property reading to create the contact indication. The electrical property meter may include an ammeter and/or a volt meter.

FIG. 3 shows a detail of the schematic of an embodiment of the control circuit 40 of FIGS. 1 and 2, with a processor 48 including at least one instance of a controller 80. As used herein, a controller receives at least one input, updates and maintains at least one state, and generates at least one output based upon the value of at least one of the inputs and/or of at least one of the states. The controller may include an inferential engine, a finite state machine, a neural network and/or a computer. Of these embodiments, the computer 82 will be discussed in more detail. This is done to simplify the discussion and is not meant to limit the scope of the claims.

The controller 80 may include a computer 82 accessibly coupled via a buss 84 to a memory 86. The computer is instructed by a program system 90 to at least partly implement receiving the electrical property reading 72 to create the contact indication 74. The electrical property meter 70 may include an ammeter 76 and/or a voltmeter 78.

As used herein the computer 82 includes at least one data processor and at least one instruction processor instructed by the program system 90 to further implement receiving the electrical property reading 72 to create the contact indication 74. Each of the data processors is instructed by at least one of the instruction processors.

The processor 48 may receive the electrical property reading 72 to determine the contact indication 74 of the slider 20 with the rotating disk surface 6. The processor may further update a contact history 90 when the contact indication is determined and may also update an access parameter list 92 for the slider accessing the rotating disk surface based upon the contact log.

Figure 4:
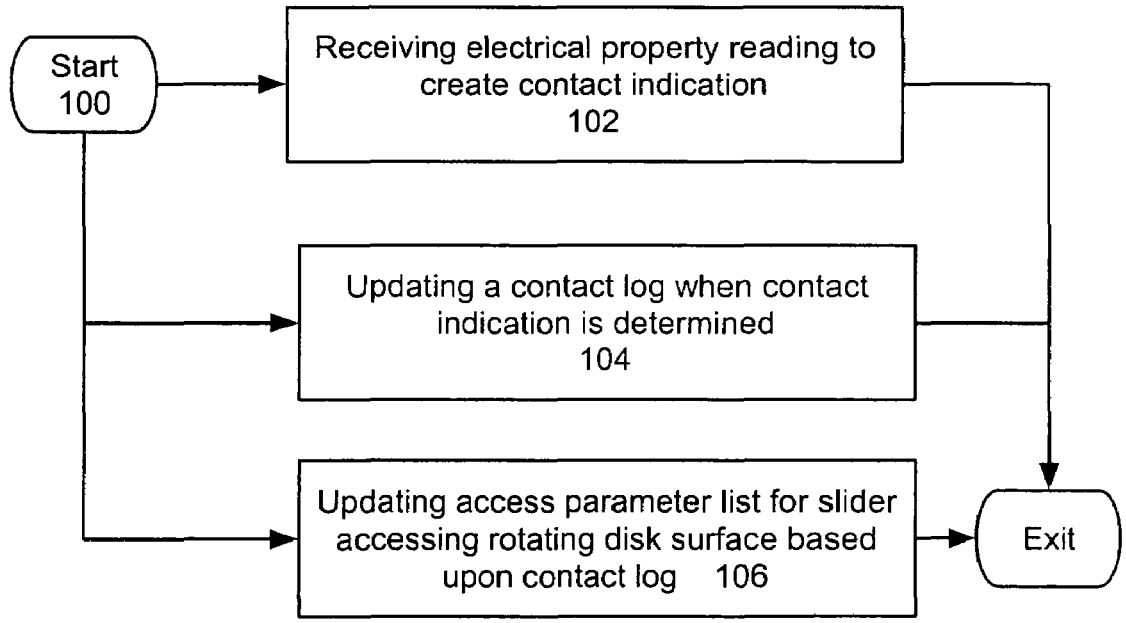
FIG. 4 shows a detail of the program system instructing the computer to receive the electrical property reading to create the contact indication. The program system may further instruct updating a contact log when the contact indication is determined and possibly updating an access parameter list based upon the contact history.

FIG. 4 shows a detail of the program system 100 including the following program steps for instructing the computer 82: Program step 102 instructs the computer 82 to receive the electrical property reading 72 to create the contact indication 74. Program step 104 instructs updating contact history 90 when the contact indication is determined. And program step 106 instructs updating an access parameter list 92 based upon the contact log.

The access parameter list 92 may include a vertical micro-actuator control value, by which a vertical micro-actuator included in the head gimbal assembly 26 is controlled while the read-write head of the slider 20 access a track on the rotating disk surface. The access parameter list may be organized into contiguous groups of tracks 22, which use a single collection of access parameters when they are being accessed. These access parameters may be the same for reading as for writing a track, or they may differ.

Figure 5:
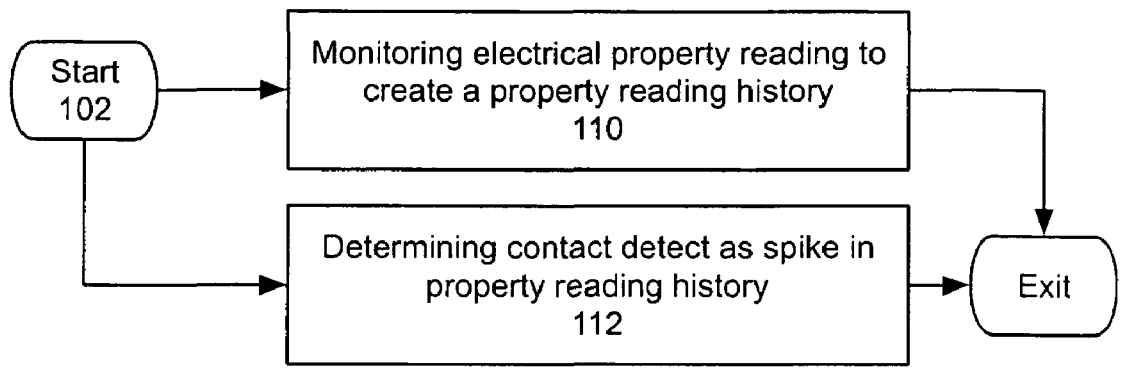
FIG. 5 shows some further details of receiving the electrical property reading to create the contact indication.

FIG. 5 shows some further details of the program steps 102 receiving the electrical property reading 72 to create the contact indication 74. Program step 110 supports monitoring the electrical property reading to create a property reading history 88. Program step 112 supports determining the contact indication as a spike 68 in the property reading history.

Figure 6:
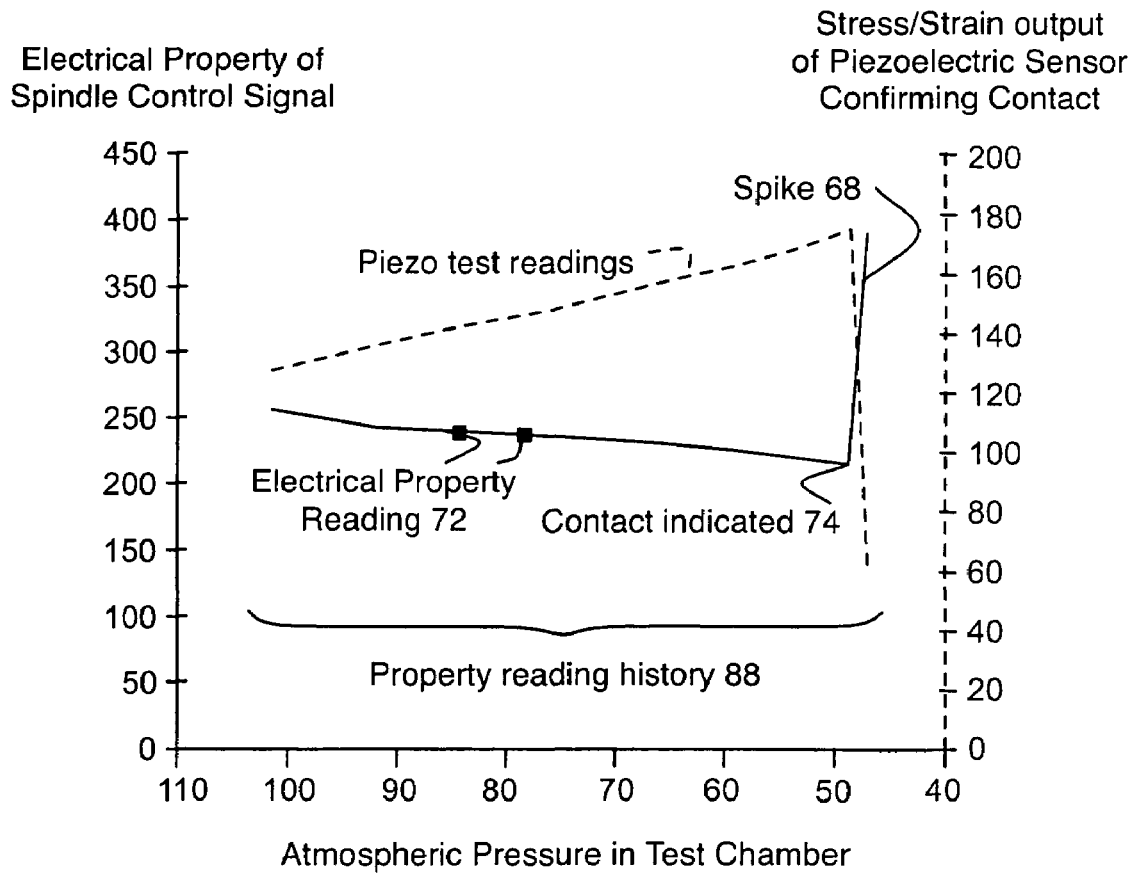
FIG. 6 shows a chart of an experiment in contact indication between the slider and the rotating disk surface. The property reading history shows the individual electrical property readings, the spike and the contact detect, where the sensed electrical property of the spindle control signal was current.

FIG. 6 shows a chart of an experiment in contact indication between the slider 20 and the rotating disk surface 6 in an experimental test stand for a hard disk drive 10. The property reading history 88 shows multiple individual electrical property readings 72, the spike 68 and the contact detect 74, where the electrical property was current. What follows is a discussion of that experiment as a demonstration of an actual reduction to practice of the indication of the contact.

A hard disk drive 10 was placed in a chamber where the atmospheric pressure could be controlled and monitored. The atmospheric pressure of the chamber is shown along the horizontal axis measured in units of kilo-Pascals (kPa). The spindle current of the spindle control signal 64 was measured by the electrical property meter 70 to create the electrical property readings 72 shown as the solid trace form the property reading history 88. The current measurements are shown on the left vertical axis in units of milliamps (ma). A read-back signal was generated by a piezoelectric device, which was coupled to the slider to measure the stress/strain on the slider to confirm the contact event. These readings are shown as the dashed trace and are measure in units of milli-Volts (mV) on the right vertical axis.

The hard disk drive 10 was put in a normal access condition with the slider 20 positioned normally above the rotating disk surface 6. The air pressure started at about 100 kPa and was reduced until around 47 kPa, the slider made contact with the disk surface. Up until that point, the slider current had declined, because as the atmospheric pressure decreased, so did the drag on the spindle motor 14 from the disks 12. At about 47 kPa, the spindle current quickly rose from about 220 mA to about 390 mA. The contact was confirmed by the read-back signal, which jumped from about 173 mV to about 60 mV, which coincided with the spike 68 in the property reading history 88. This experimentally confirmed the use of that spike to determine the contact indication 74. As used herein a spike will be any reading over a selected multiple of the standard deviation from the norm. The selected multiple could be as small as 1, but is preferably 3 or more.

In further detail, embodiments of the hard disk drive 10 may fit into a standard form factor. It may fit into a two and one half (2.5) inch form factor. The hard disk drive may further fit in a form factor smaller than 2.5 inches, which may or may not be expressed in English units.

The preceding embodiments provide examples of the invention and are not meant to constrain the scope of the following claims.

What is claimed is:

1. A hard disk drive, comprising:
    a disk base;
    a spindle motor mounted on said disk base, said spindle motor rotatably coupled to at least one disk to create a rotating disk surface;
    a voice coil motor pivotably mounted on said disk base by an actuator pivot to position at least one slider over said rotating disk surface;
    an electrical property meter electrically coupled to a control path for sensing a spindle control signal delivered by said control path, to create an electrical property reading; and
    a control circuit configured for controlling said spindle control signal to stimulate said spindle motor to rotate said at least one disk, said control circuit further configured for receiving said electrical property reading to create a contact indication of said slider contacting said rotating disk surface.

2. The hard disk drive of claim 1, wherein said electrical property meter includes at least one member of the group consisting of an ammeter and a volt meter.

3. The hard disk drive of claim 1, wherein said control circuit further comprises a processor configured for monitoring said electrical property reading to create a property reading history and further configured for determining said contact indication as a spike in said property reading history.

4. The hard disk drive of claim 3, wherein said electrical property history indicates at least two of said electrical property readings at distinct times.

5. The hard disk drive of claim 3, wherein said processor includes at least one instance of at least one controller.

6. The hard disk drive of claim 5, wherein at least one of said controllers includes at least one computer accessibly coupled to a memory and instructed by a program system including at least one program step residing in said memory, said program system at least partly implementing receiving said electrical property reading to create said contact indication.

7. The hard disk drive of claim 6, wherein said program system comprises the program step of: receiving said electrical property reading to create said contact indication.

8. The hard disk drive of claim 7, wherein the program step of receiving said electrical property reading to create said contact indication, further comprises the program steps of:
    monitoring said electrical property reading to create an electrical property history; and
    determining said contact indication as a spike in said electrical property history.

9. The hard disk drive of claim 3, wherein said processor is configured to update a contact log in response to determining said contact indication.

10. The hard disk drive of claim 9, wherein said processor is configured to use said contact log to update an access parameter list for said slider accessing said rotating disk surface.

11. The hard disk drive of claim 1, wherein said control circuit is further configured to control a motor control interface to generate said spindle control signal presented to said spindle motor and to said electrical property meter.

12. The hard disk drive of claim 1, further comprising a motor control interface, comprising:
    said control path configured to deliver said spindle control signal to stimulate said spindle motor to rotate said disk to create said rotating disk surface; and
    said electrical property meter configured to create said electrical property reading to indicate a contact of said slider to said rotating disk surface.

13. The hard disk drive of claim 1, further comprising a printed circuit board assembly, comprising:
    said control path configured to deliver said spindle control signal to stimulate said spindle motor to rotate said disk to create said rotating disk surface; and
    said electrical property meter configured to create said electrical property reading to indicate a contact of said slider to said rotating disk surface.

14. The hard disk drive of claim 1, wherein said control circuit, comprising a processor configured to operate in said hard disk drive to receive said electrical property reading to create said contact indication of said slider contacting said rotating disk surface, wherein said electrical property is a measurement of said spindle control signal for stimulating said spindle motor to rotate said disk.

15. The hard disk drive of claim 14. wherein said control circuit, further comprising said electrical property meter electrically coupled to said control signal path for delivering said spindle control signal, to create said electrical property reading.

16. A method of operating said hard disk drive of claim 1, comprising the steps:
    stimulating said spindle motor by said control circuit with said spindle control signal to rotate said at least one disk, creating said rotating disk surface accessed by said slider;

sensing said spindle control signal with said electrical property meter to create said electrical property reading; and receiving said electrical property reading with said control circuit within said hard disk drive to create said contact indication of said slider contacting said rotating disk surface.

17. A method of operating a hard disk drive comprising the steps of:

stimulating a spindle motor with a spindle control signal to rotate at least one disk, creating a rotating disk surface accessed by a slider;

sensing said spindle control signal with an electrical property meter to create an electrical property reading; and receiving said electrical property reading with a control circuit to create a contact indication of said slider contacting said rotating disk surface, further comprises the steps of:

monitoring said electrical property reading with said control circuit to create an electrical property history; and determining said contact indication as a spike in said electrical property history with said control circuit.

18. The method of claim 17, wherein said electrical property history indicates at least two of said electrical property readings at distinct times.

19. The method of claim 17, wherein said electrical property reading includes at least one member of the group consisting of a current reading and a voltage reading.

* * * * *